May 3, 1966 L. O. BARTHOLD 3,249,773
OPTIMIZATION OF OPEN-WIRE TRANSMISSION LINES
Filed Aug. 31, 1962 4 Sheets-Sheet 1
Fig. 1(a.)
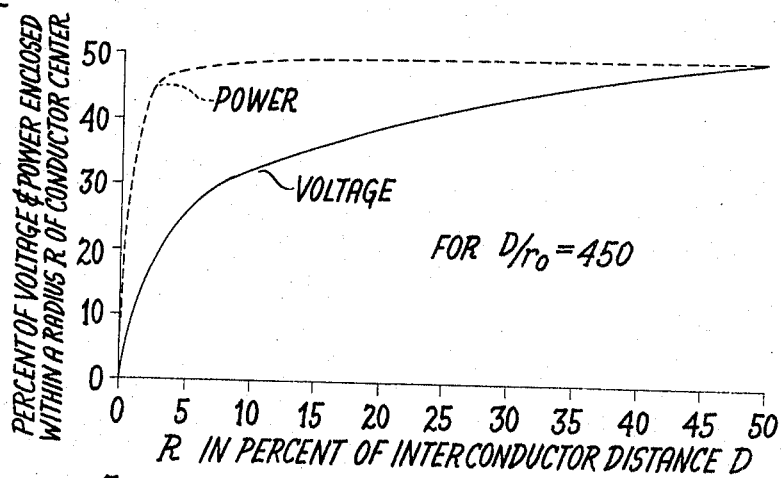
Fig. 1(b.)
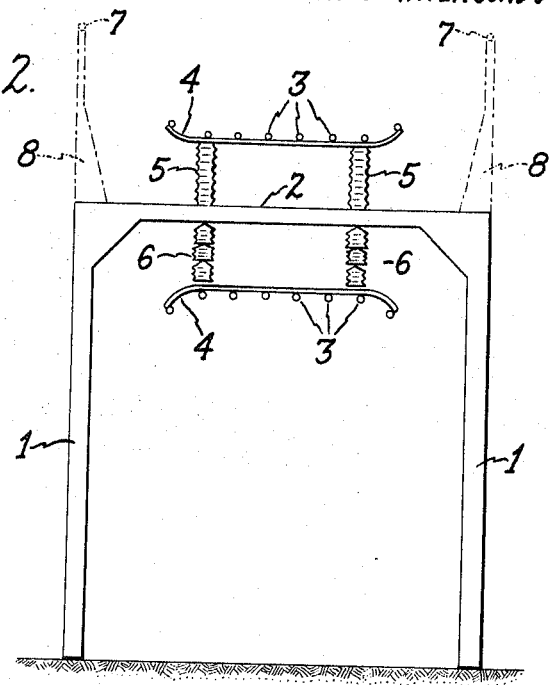
Fig. 2.
Inventor,
Lionel O. Barthold,
by Gilbert P. Tarleton
His Attorney.

May 3, 1966     L. O. BARTHOLD     3,249,773
OPTIMIZATION OF OPEN-WIRE TRANSMISSION LINES
Filed Aug. 31, 1962     4 Sheets-Sheet 2
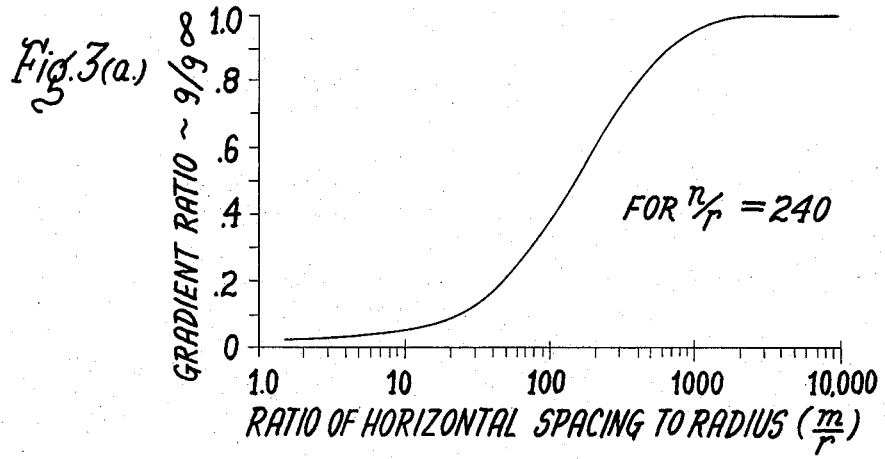
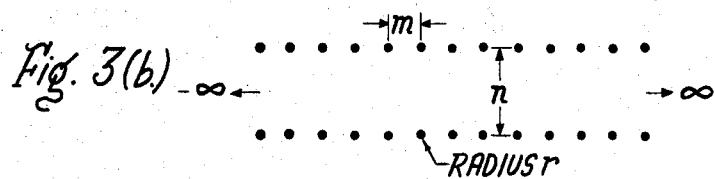
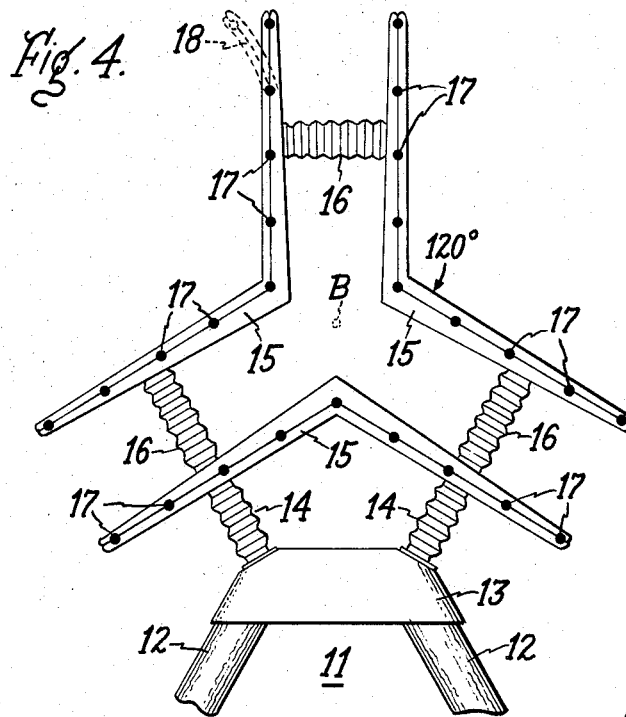
Inventor,
Lionel O. Barthold,
by Gilbert P. Tarleton
His Attorney.

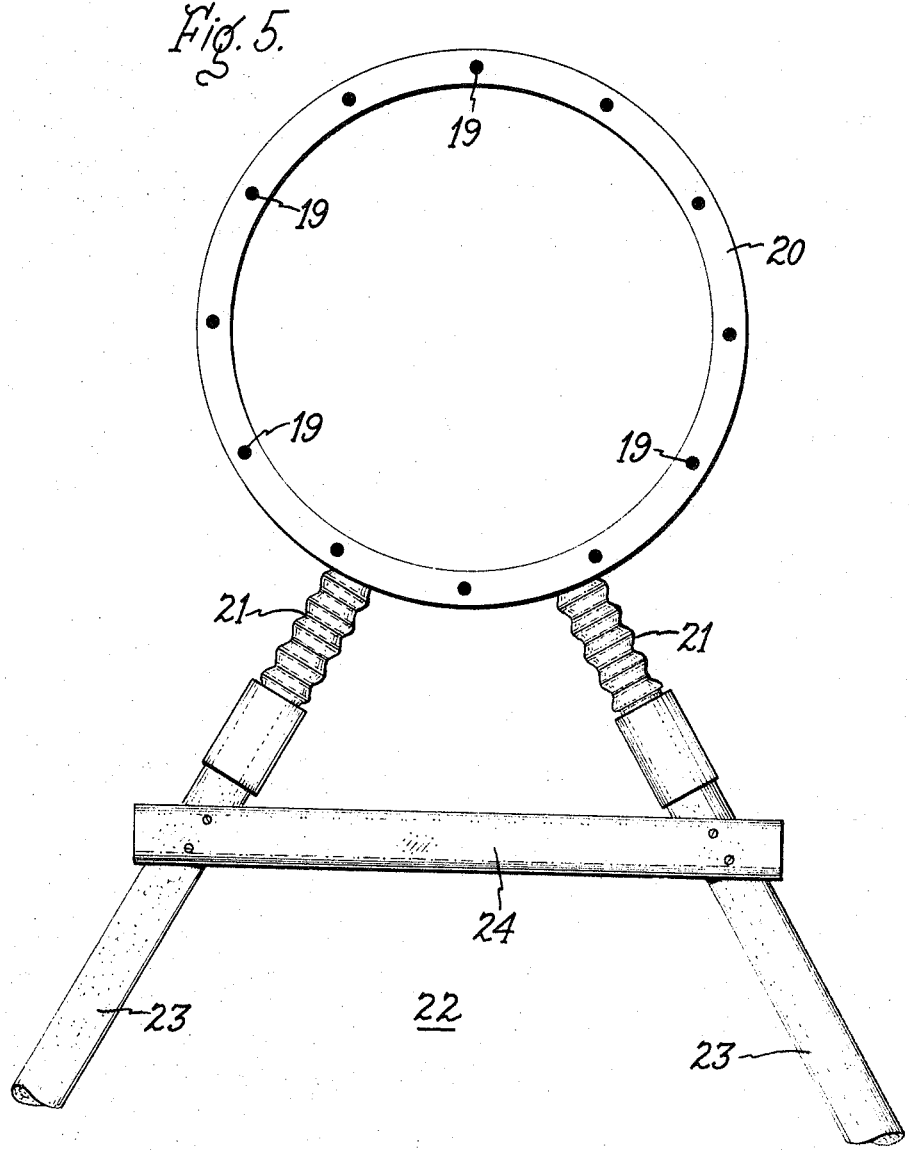

May 3, 1966    L. O. BARTHOLD    3,249,773
OPTIMIZATION OF OPEN-WIRE TRANSMISSION LINES
Filed Aug. 31, 1962    4 Sheets-Sheet 4

*Fig. 6(a.)*

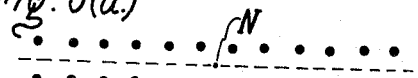

1 PHASE OR DC (12 CONDUCTORS PER ARRAY EACH WITH VOLTAGE TO NEUTRAL AND 12 CONDUCTOR PAIRS EACH WITH TWICE VOLTAGE TO NEUTRAL)

*Fig. 6(b.)*

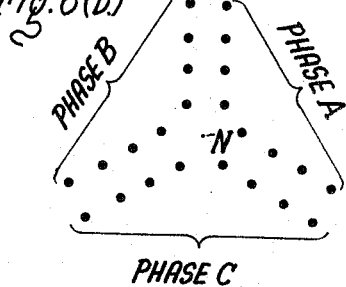

PHASE C
3 PHASE (8 CONDUCTORS PER PHASE AT PHASE TO NEUTRAL VOLTAGE AND 4 CONDUCTOR PAIRS PER PHASE TO PHASE VOLTAGE)

*Fig. 6(c.)*

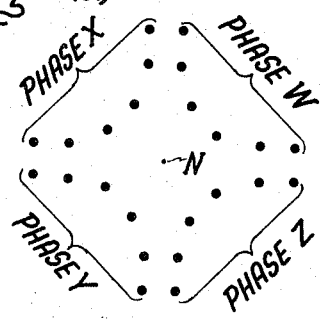

4 PHASE (6 CONDUCTORS PER PHASE AT PHASE TO NEUTRAL VOLTAGE AND 3 CONDUCTOR PAIRS PER PHASE TO PHASE VOLTAGE)

*Fig. 6(d.)*

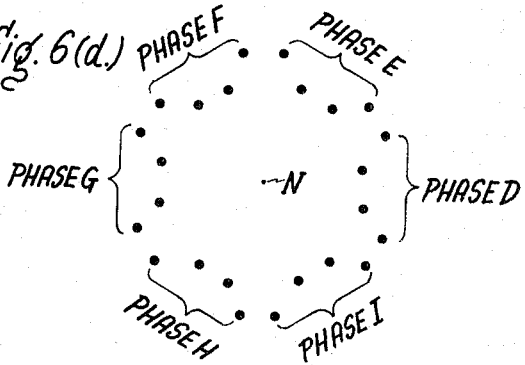

6 PHASE (4 CONDUCTORS PER PHASE AT PHASE TO NEUTRAL VOLTAGE AND 2 CONDUCTOR PAIRS PER ADJACENT PHASE TO PHASE VOLTAGE

*Fig. 6(e.)*

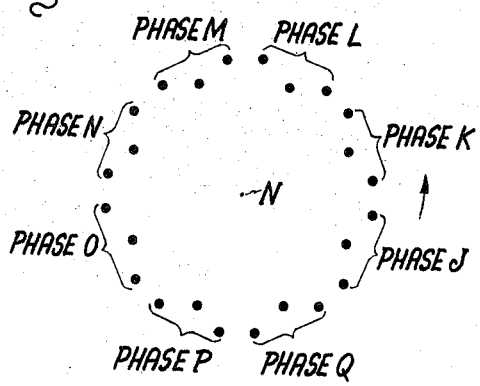

8 PHASE (3 CONDUCTORS PER PHASE)

*Fig. 6(f.)*

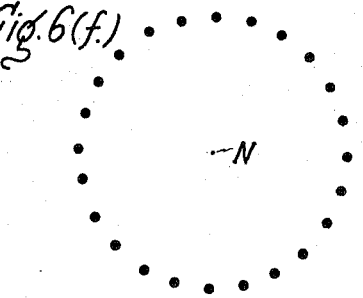

24 PHASE (1 CONDUCTOR PER PHASE)

Inventor,
Lionel O. Barthold,
by Gilbert P. Tarleton
His Attorney.

United States Patent Office 3,249,773
Patented May 3, 1966

3,249,773
OPTIMIZATION OF OPEN-WIRE TRANSMISSION LINES
Lionel O. Barthold, Burnt Hills, N.Y., assignor to General Electric Company, a corporation of New York
Filed Aug. 31, 1962, Ser. No. 220,702
15 Claims. (Cl. 307—147)

This invention relates to open-wire, high voltage electric power transmission lines and more particularly to increasing the utilization efficiency of the air space occupied by such lines.

The growth in electric power transmission requirements has traditionally been met through the purchase of additional rights-of-way for new lines and/or increases in the power transmitting capacity of lines through increases in their operating voltage. Both aspects of this growth pattern have suffered from the rising cost or unavailability of new rights-of-way (including widening of existing rights-of way) and create an incentive for new methods of transmitting large blocks of power on relatively narrow rights-of-way.

Any device capable of transmitting power must, in the process of transmittal, contain the power by means of stresses in the transmitting medium. In the case of overhead transmission lines, these stresses are electrical. While the total power being transmitted may be described in terms of voltage between conductors and current in the conductors, the distribution of the power in the transmitting medium (air) requires an examination of the total cross-sectional area through which the line passes.

Poynting's theorem permits such analysis and shows that, for typical high-voltage lines, over 90% of the total power transmitted is stored within a cylindrical surface surrounding each conductor, said cylinder having a radius of only 5% of the conductor-to-conductor spacing. Also the bulk of the total voltage drop between the conductors occurs near the conductor surface.

As system voltages increase, the general dictates of economics result in conductor sizes which, in relation to the applied conductor-to-conductor voltage, result in an increase in the voltage gradient at the conductor surface. This gradient manifests itself in corona discharges which, in turn, produce radio interference and power loss. A common expedient for controlling such corona discharges is the division of the cross section area of each conductor into several subconductors electrically connected but physically separated by the order of 18″. For a given cross-sectional area of conducting material, this subdivision (bundling) results in a reduced surface gradient and an attendant reduction in corona. A second expedient is the expansion of conductors with a non-conducting filler. This results in lower surface gradient and corona by increasing the outside diameter of the conductor.

In accordance with this invention, the conductors constituting the line are so oriented as to produce approximately uniform field conditions in the air space occupied by the line so as to permit increased power within a given air space, while at the same time maintaining a low voltage gradient at the conductor surface. One example of this invention is to array the conductors by effectively linearly and transversely expanding them so that the electric field approximates that of a parallel plate air capacitor. This is particularly effective for direct-current transmission or alternating current transmission with one or a few phases. Another way that this is done is to greatly increase the number of phases and arrange the phase conductors sequentially around a common center or axis so as to produce a uniform rotating field in the air space between them.

An object of the invention is to provide a new and improved open-wire, high-voltage electric power transmission line.

Another object of the invention is to increase the amount of power capable of being transmitted on one line configuration at a given conductor-to-conductor voltage.

Another object of the invention is to increase the amount of power capable of being transmitted through a given right-of-way corridor at a given voltage.

Another object of the invention is to reduce the series inductive reactance per mile of A.-C. transmission lines.

Another object of this invention is to interpose a multiplicity of conventional three-phase circuits so as to occupy the space normally required by just one, while at the same time producing approximately the same net reactance between terminals as would result from the circuits occupying separate rights-of-way.

Another object of the invention is to increase the utilization effectiveness of the air space occupied by open-wire, high-voltage electric power transmission lines.

A further object of the invention is to provide a novel way to decrease the nonuniformity of the electric field conditions in the air space occupied by open-wire, high-voltage electric power transmission lines.

The invention will be better understood from the following description taken in connection with the accompanying drawings and its scope will be pointed out in the appended claims.

In the drawings,

FIGS. 1(a) and 1(b) show the voltage and power distribution between conductors of a two conductor transmission line of conventional proportions.

FIG. 2 is a sectional view of a transmission line at a tower embodying an application of the invention particularly suitable for direct current or single-phase alternating current transmission, FIGS. 3(a) and 3(b) show the reduction in voltage gradient at the conductor surfaces attained by the invention, FIG. 4 is a modification of the invention suitable for three-phase operation.

FIG. 5 is another modification of the invention suitable for twelve-phase operation, and FIGS. 6(a–f) show the interrelation of additional species of the invention to the species shown in FIGS. 2, 4 and 5.

Referring now to the drawings, and more particularly to FIG. 1(a) represents in cross section, but not to scale, an open-wire two-conductor transmission line having a conductor radius $r_0$ and an interconductor spacing D and (b) represents graphically the voltage and power distribution in the air space surrounding either conductor for a typical high voltage line configuration in which the interconductor spacing is 450 times the conductor radius, i.e. $D/r_0=450$. As indicated (b) shows this distribution in terms of percent of total voltage and power enclosed in a radius R from the conductor center expressed in percent of interconductor distance D. As would be expected from the symmetry of (a), when $R=50\%$ the voltage and power both also equal 50% but over lesser values of R the variation in voltage and power is far from linear and the variation in power is far less linear than the variation in voltage. Thus while 45% voltage corresponds to a value of $R=33.75$ the same percentage of power corresponds to $R=2.5\%$ at which value of R the voltage is 20%. For reductions of R below 5 the steepness of the curves increases rapidly. Steepness corresponds to gradient and voltage gradient or stress is a critical factor in the formation of corona discharge.

Referring now to FIG. 2, there is shown therein a portal-type transmission line tower having upright supporting members 1 and a transverse or horizontal member 2 which serves to support two conductor arrays. The upper array consists of a comparatively large number of comparatively small conductors 3, which are electrically and mechanically connected by a supporting member 4, which may be made from a metal such as aluminum. The basis for comparison is a conventional FIG. 1 (a) line of comparable voltage and power rating. This upper array is supported from the transverse tower member 2 by several post-type insulators 5. The lower conductor array consists of a similar conductor and support assembly, 3 and 4, except in this case supported from the transverse tower member by suspension insulators 6. As shown in FIG. 2 there are eight conductors in the upper array attached to the upper horizontal member 4, and eight conductors in the array attached to the lower horizontal member 4, making sixteen conductors in all. In this particular example, the radius of the conductors may be one-half inch and the horizontal spacing between conductors may be two feet with the vertical spacing between conductor arrays being ten feet.

Also shown in FIG. 2 are shield wires 7 and tower extensions 8 for lightning protection in installations where such protection is required.

FIG. 3(a) shows how the voltage gradient $g$ at the surface of the conductors in a single-phase parallel array (b), infinite in extent, decreases as the ratio of horizontal spacing of the conductors, $m$, to the conductor radius, $r$, is reduced. FIG. 3 applies specifically to the case where the ratio $n/r = 240$ where $n$ is the vertical separation of the arrays. In FIG. 3(a) the gradient $g$ is expressed in per unit of $g\infty$ where $g\infty$ is the gradient which would exist if the spacing $m$ in FIG. 3(b) were so great that there were no horizontal proximity effect of adjacent vertically related conductor pairs. Thus, for values of $m/r$ above 1000, the proximity effect is negligible and the line would correspond to a plurality of separate lines, each having a vertically related conductor pair. Under these conditions, the voltage gradient ratio $g/g\infty$ at the conductor surfaces is indicated as unity. However, as the horizontal spacing of the conductor pairs in terms of their radii is decreased below 1000, the adjacent conductor pairs begin to influence each other and reduce the voltage gradient at the conductor surfaces.

In the particular example given in FIG. 2, the horizontal spacing is two feet and the radius is a half inch and $m/r$ will be 48, $n/r$ is 240, and the gradient will be about 70% of that existing on a line where there is no such proximity effect between adjacent conductor pairs. In other words, the line in FIG. 2 produces field conditions in the air space between the conductor arrays 3, which approaches what would exist in a parallel plate or plane capacitor or electrostatic condenser of infinite extent. However, inasmuch as the arrays are finite, it is desirable to curve the ends of the spacer members 4 outwardly at their ends as shown in FIG. 2 so as to produce somewhat greater vertical spacing and thus compensate for edge or end effects of the finite arrays which effects are such as to tend to increase the voltage gradient.

In such a line it will be advisable to have additional spacers corresponding to the horizontal member 4 only of lighter construction located across the spans between towers of the line so as to maintain proper spacing of the individual conductors of each array under varying wind conditions.

In FIG. 4 there is shown a three phase embodiment of the invention which comprises a tower 11 which may comprise a pair of wooden poles 12 yoked together at their upper ends by a cross member 13. This supports a pair of post insulators 14 which in turn support three yoke members 15 which may, for example, be constructed of aluminum and which are shown substantially identical and being of V-shape with an included angle of 120 degrees. These yoke members 15 are arranged symmetrically and spaced apart by post insulator members 16 so that each straight side or leg of each of the V-shaped spacers 15 is parallel with and equally spaced from a straight side or leg of a different one of the other two yoke members. Thus the arrangement is such that the yoke members 15 are symmetrically mounted about a common center, with the apices of their V's pointed inwardly toward that center. Supported by each yoke member is a plurality of conductor wires or cables 17 which are preferably equally spaced and of the same number for each yoke member 15. They can conveniently be secured to these yoke members by suitable clamps. As shown in FIG. 4 there are nine such conductors supported by each yoke member, there being one conductor at the apex of each V and four more along each leg thereof.

Each yoke member 15 and its associated conductors comprise one phase conductor of the three-phase line and it will be seen that as between any two phases there will be five conductors arranged in a straight line separated by an equal space from five other conductors arranged in a parallel straight line. Thus such an arrangement reduces the voltage gradient at the conductor surfaces by means of the proximity effect of adjacent conductor pairs as explained in connection with FIG. 3. For purposes of comparison there are shown conductors A, B, and C spaced apart in a horizontal line as in a conventional three-phase transmission line construction with the center phase conductor B located at the center point of the array shown in FIG. 4. This would represent the spacing of the three conductors of a conventional line in order to obtain about the same voltage gradient for the same line voltage as is produced by what can be called the Y configuration of the invention shown in FIG. 4, thus indicating how much more compact and much less space is occupied by the line of the present invention as compared with a conventional line for the same operating voltage.

As indicated by the dashed lines at 18 the end conductors 17 may be offset to equalize the surface gradient and dielectric strength due to the edge effect of the finite conductor arrays.

As with FIG. 2 it will be preferable to have one or more sets of yoke members corresponding to the members 15 located in the spans between towers and supported by the conductors 17 and held in proper spaced relation by insulators corresponding to post insulators 16 so as to maintain proper orientation of the wires in the spans between towers of the line under varying wind conditions.

FIG. 5 shows another modification of the invention in which the number of conductors per phase is reduced in comparison with FIGS. 2 and 4, whereas the number of phases is increased substantially in comparison with FIGS. 2 and 4. Thus FIG. 5 shows a twelve-phase modification in which there is one conductor per phase, these conductors being indicated at 19 as being equally spaced around the circumference of a circle and being arranged in physical sequence corresponding to their electrical phase sequence. As shown, they may be supported by being clamped or otherwise secured to an insulating ring-shaped support 20 which in turn is supported by post insulators 21 from a tower 22 which may consist of wooden poles 23 fastened together at the top by a cross member 24. With such an arrangement a generally uniform rotating magnetic field will exist in the space enclosed by the circular array of conductors 19.

The proper twelve-phase energization of the line conductors may easily be obtained from three-phase generators by well-known transformer connections such as are used, for example, in multiphase rectifier installations.

As in FIGS. 2 and 4 it will be desirable to provide additional circular spacer members 20 supported by the conductors 19 in the spans between adjacent towers so as to maintain proper spacing of the wires under varying wind conditions.

The theoretical limit of the FIG. 5 type modification would be an infinite number of phases each of whose conductors would be an element of a circular cylinder of material having the properties of a conductor in the axial direction and the properties of an insulator in the circumferential direction.

FIG. 6 shows additional modifications of the invention wherein (a) is similar to FIG. 2 but has twelve conductors per array instead of eight as in FIG. 2, (b) is similar to FIG. 4 but has eight conductors per phase instead of nine as in FIG. 4, (c) is a four-phase species having six conductors per phase, (d) is a six-phase species having four conductors per phase, (e) is an eight phase species having three conductors per phase and (f) is similar to FIG. 5 but has twice as many phases, i.e., twenty-four but with only one conductor per phase. In (a) through (f) a neutral voltage point N about which all are symmetrical has been indicated. In (a) it is the center point of a dashed line representing the neutral or ground plane between the conductor arrays. In (b) it is the center of the Y-shaped configuration. In (c) it is the center of the star or cross-shaped configuration. In the others, it is the center of the figure whose shape approaches a circle as the number of phases increases. In a sense (d) is a special case bridging (a) through (c) on the one hand and (e)–(f) on the other hand. This is because with six phases the phase to neutral voltage equals the successive or adjacent phase to phase voltages. In the single phase or D.C. species (a) the conductor to neutral voltage is half the conductor to conductor voltage, in the three-phase species the ratio is the $\sqrt{3}$ and in the four phase species it is the $\sqrt{2}$. Above six phases it is progressively less than unity as the number of phases increases. It will also be observed that (e) is two interposed four-phase systems displaced 45 electrical degrees and that (d) is two interposed three-phase systems displaced 30 electrical degrees. Likewise FIG. 5 and FIG. 6 (f) are 4 and 8 interposed three-phase systems displaced by appropriately lesser electrical degrees to give symmetry.

*Power handling capacity*

The power handling capacity of a D.-C. line of a given operating voltage is limited mainly by the safe thermal loading of the conductors. Thus, added capacity can be achieved by either building additional lines or by enlarging the conductors on a given line. This invention, as it applies to the D.-C. case, achieves the latter recourse while at the same time greatly reducing the surface gradient of the individual conductors.

The power handling capacity of A.-C. lines is usually limited by and inversely proportional to positive sequence reactance or surge impedance, the latter being the square root of the quotient of positive sequence series inductance and positive sequence shunt capacitance.

For either of the two foregoing criteria, the power handling capacity of a system of one or more single-circuit lines is increased in direct proportion to the number of parallel lines, as long as the lines are reasonably far apart. If they are in close juxtaposition, as is the case when two such circuits are supported by a common tower (double circuit line), the net surge impedance and net series reactance is somewhat more than one-half the value of either line considered separately due to mutual coupling between the two circuits.

For the A.-C. case, this invention may be interpreted as allowing the interposition of a large number of single-circuit, three-phase lines in such a way as to yield a positive sequence surge impedance and a positive sequence inductive reactance approximating that which would be achieved by putting the circuits on separate rights-of-way. For example, if any three conductors which are 120° displaced from one another in FIG. 5 are removed from the context of FIG. 5 and considered as a single, three-phase circuit and if each conductor comprising this three-phase circuit lies a distance from the center of symmetry equal to 624 times the radius of an individual conductor, then the positive sequence surge impedance is 393 ohms and the series inductive reactance is .81 ohm per mile.

If four such circuits were built on separate rights-of-way and then operated in parallel, the positive sequence surge impedance and series inductive reactance would be reduced by a factor of four to 98 ohms and .20 ohm per mile respectively. If these circuits are interposed in accordance with this invention, as shown particularly in FIG. 5, the positive sequence surge impedance of the composite 12-wire system is 142 ohms and the positive sequence series inductive reactance is .39 ohm.

A similar interposition can be achieved by arranging the conductors in the Y configuration illustrated in FIG. 4. In this case, the interposed circuits all retain the same relative electrical phase angle, whereas in the circular array of FIG. 5 the electrical angles of the interposed circuits are displaced so as to provide equal electrical angles between all adjacent conductors.

In either of the foregoing methods of circuit interposition, a great number of circuits could be interposed to form a composite circuit which occupies about the same space as that formerly occupied by one circuit. Also, in either of the methods, the positive sequence surge impedance and series inductive reactance may be further reduced by subdividing the conductor material comprising the individual wires so as to increase the total number of wires.

While there have been shown and describd particular embodiments of the invention, it will be obvious to those skilled in the art that changes and modifications may be made without departing from the invention, and therefore it is intended by the appended claims to cover all such changes and modifications as fall within the true spirit and scope of the invention.

What I claim as new and desire to secure by Letters Patent of the United States is:

1. A single-phase, open-air, electric power transmission line whose frequency can be anywhere from zero (direct current) to the upper limit of commercial alternating current power transmission frequency (now typically 60 cycles per second) comprising, in combination, a series of portal-type towers each having a horizontal member supported at the ends by separate upright members, a plurality of separate suspension insulators hung from said horizontal member, a transverse spacer member supportingly attached to the lower ends of said suspension insulators, a plurality of equally spaced equal diameter wires attached to said spacer member, a substantially equal number of similar wires attached in similarly spaced relation to a second horizontal spacer member, and post-type insulators extending upward from the horizontal tower member for supporting said second spacer member, the length of each of said kinds of insulators being of the order of hundreds of times the radius of said wires, the horizontal spacing of the wires on said horizontal spacer members being less than a hundred times their radius, the number of said wires being such that their horizontal arrays are wider than each of said kinds of insulators are long.

2. A three-phase, open-wire, high-voltage electric power transmission line comprising, in combination, three insulated phase conductors each comprising a number of equispaced equal diameter equipotential wires arranged in V-configuration having an included angle of 120 degrees, said V-configurations being symmetrically oriented about a common center so that the respective spacings between the two arms of any V and one arm of each of the other two V's are equal.

3. A three-phase, open-wire, high-voltage electric power transmission line comprising, in combination, three insulated arrays of spaced wires with the wires of each array being uninsulated from each other, each array comprising half of its wires in one plane and half of its wires in another plane with an included angle of 120 degrees between said planes, said arrays being so oriented that each plane of any one array is parallel to and equally spaced from a plane of a different one of the other two arrays so that said line has a Y-shaped configuration in cross-section.

4. In a three-phase transmission line a tower assembly comprising three identical V-shaped metallic yoke members each having an included angle of 120 degrees, post insulators for spacing said yoke members symmetrically about a common center in a common plane with their apices pointing toward said center and with their adjacent legs parallel and equally spaced, and an equal number of parallel conducting wires supported in equally spaced relation by each of said yoke members.

5. A line as defined in claim 4 in which there is at least one wire supported at the apex of each yoke member and at least two wires supported by each leg of each yoke member.

6. A line consisting of P phase arrays of N wires per phase arranged symmetrically about a longitudinal center of symmetry, where $P \times N$ is greater than twelve, where the number of conductors per phase is inversely proportional to the number of phases, and where each phase array occupies a modified V-shaped configuration wherein the angle subtended by the V is 360° divided by the number of phases and in which the wires nearest the apex of the V are moved away from the center of symmetry in proportion to the number of phases.

7. An open wire, overhead high voltage commercial frequency alternating current power transmission line comprising N symmetrically interposed effectively electrically parallel P phase circuits each having P symmetrically disposed conductors, said interposition producing a line positive sequence surge impedance and positive sequence inductive reactance approximating that which would result if said circuits were laterally displaced from each other far enough to have negligible capacitive and inductive coupling.

8. A line as defined in claim 7 in which N is at least four and P is at least three.

9. A line as defined in claim 8 in which the voltages of the N circuits are in phase with each other and the P groups of N conductors whose voltages are in phase in each group are physically grouped rather than interposed in similar symmetrically disposed arrays.

10. A line as defined in claim 8 in which all of the $P \times N$ conductors are symmetrically disposed about a common axis, the P conductors of each circuit being symmetrically disposed and separated by $360/P$ degrees of arc of said circle, the adjacent conductors of said circuits being separated by $360/P \times N$ degrees of arc of said circle, the voltages of said circuits being displaced by $360/P \times N$ electrical degrees.

11. A supporting upper spacer member for a plurality of equally spaced equi-potential transmission line conductors comprising an elongated metal member having a straight central portion between upwardly curved end portions, and a pair of spaced parallel post insulators extending downwardly from said central portion.

12. A supporting lower spacer member for a plurality of equally spaced equi-potential transmission line conductors comprising an elongated metal member having a straight central portion between downwardly curved end portions, and a pair of spaced parallel suspension insulators extending upwardly from said central portion.

13. A conductor supporting yoke assembly for a three-phase transmission line comprising, three similar metallic yoke members each of which is for supporting in equi-spaced relation a like number of equi-potential conductors of a particular phase, said yoke members being V-shaped with an included angle of 120 degrees, post insulators between said yoke members for spacing them symmetrically about a common center in a common plane with their apices pointing toward said center and with their adjacent legs parallel and equally spaced, and additional post insulators attached respectively to the legs of one of said yoke members for insulatingly supporting said assembly.

14. An assembly as defined in claim 13 in which the ends of the legs of said V-shaped yoke members converge so that the ends of adjacent legs of different yoke members diverge.

15. A conductor supporting yoke assembly for a transmission line of symmetrically interposed polyphase circuits comprising, a ring shaped insulator for supporting in equi-circumferentially spaced relation the phase conductors of said line, and post insulators attached to said ring shaped insulator for supporting said ring shaped insulator in a vertical plane, said ring shaped insulator having as many straight holes therethrough parallel to its axis as there are phase conductors for respectively supporting said conductors without transposition.

References Cited by the Examiner

UNITED STATES PATENTS

| | | | |
|---|---|---|---|
| 1,078,711 | 11/1913 | Whitehead | 307—147 |
| 1,190,135 | 7/1916 | Faccioli | 174—127 |
| 1,606,441 | 1/1926 | Nelms. | |
| 2,008,109 | 7/1935 | Reher | 307—147 |
| 2,179,406 | 11/1939 | Fitzpatrick | 174—149 |
| 2,306,226 | 12/1942 | Schrage | 171—97 |
| 2,657,889 | 11/1953 | Smalley | 174—149 |
| 2,877,289 | 3/1959 | Schymik | 174—99 |
| 3,146,359 | 8/1964 | McKenna | 174—149 X |

ORIS L. RADER, *Primary Examiner.*

W. M. SHOOP, *Assistant Examiner.*